Nov. 4, 1952  B. B. IVANEK  2,616,446
VALVE FOR LIQUID TREATING APPARATUS
Filed Aug. 6, 1948  6 Sheets-Sheet 1
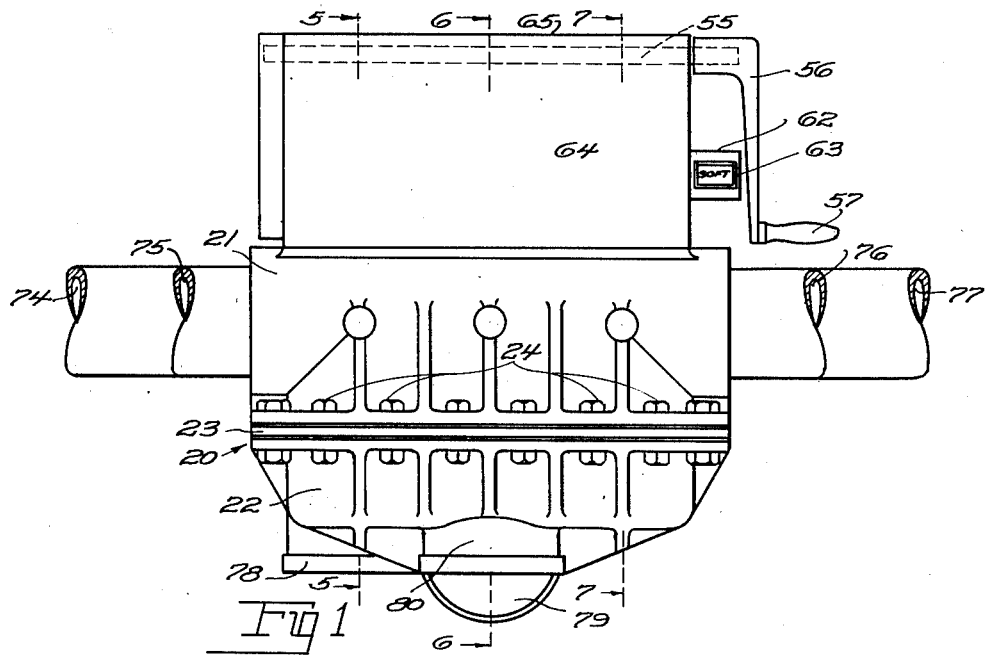
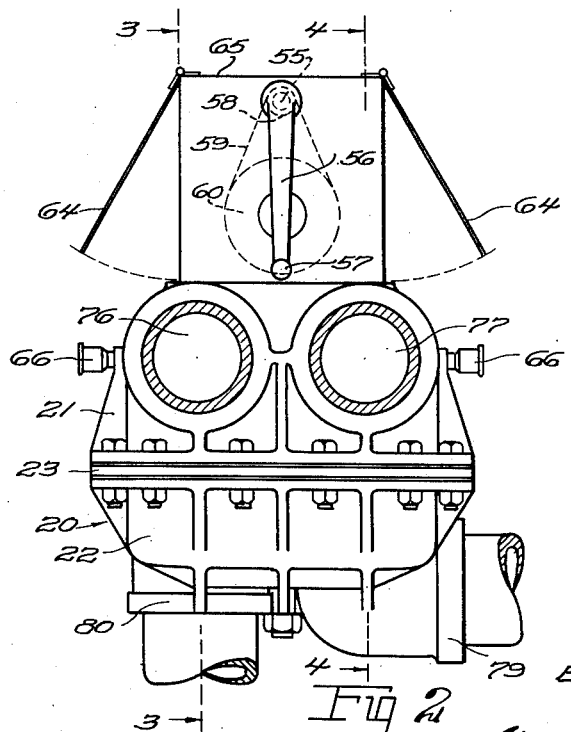
INVENTOR
BOLES B. IVANEK
BY
Fraser, Myers & Manley
ATTORNEYS Nov. 4, 1952          B. B. IVANEK          2,616,446
VALVE FOR LIQUID TREATING APPARATUS
Filed Aug. 6, 1948          6 Sheets-Sheet 2
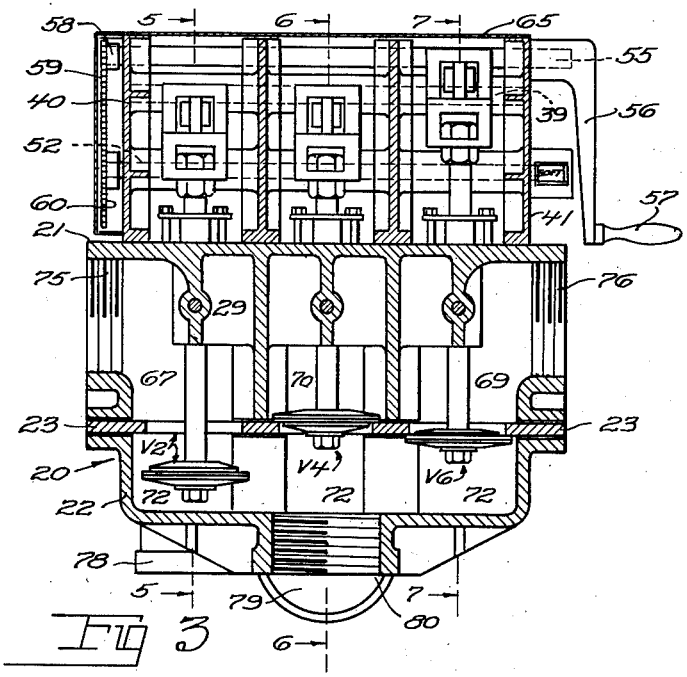
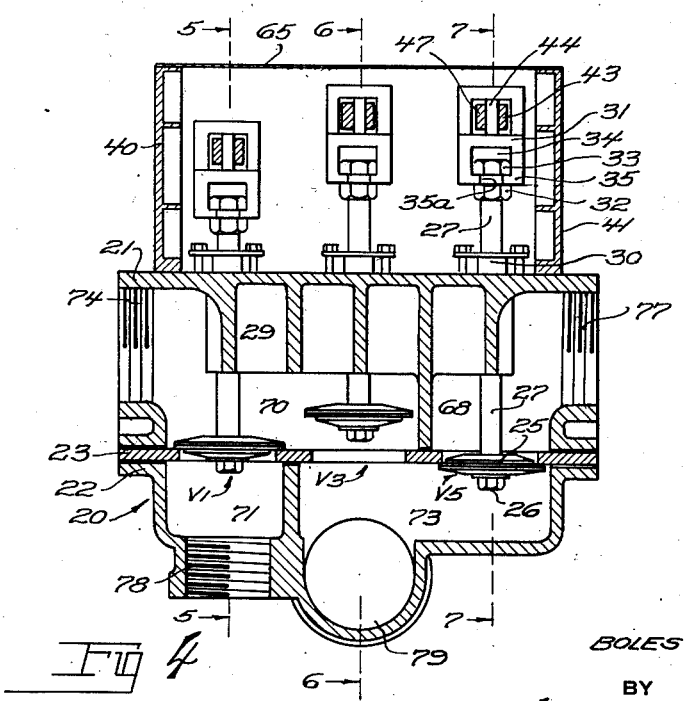
INVENTOR
BOLES B. IVANEK

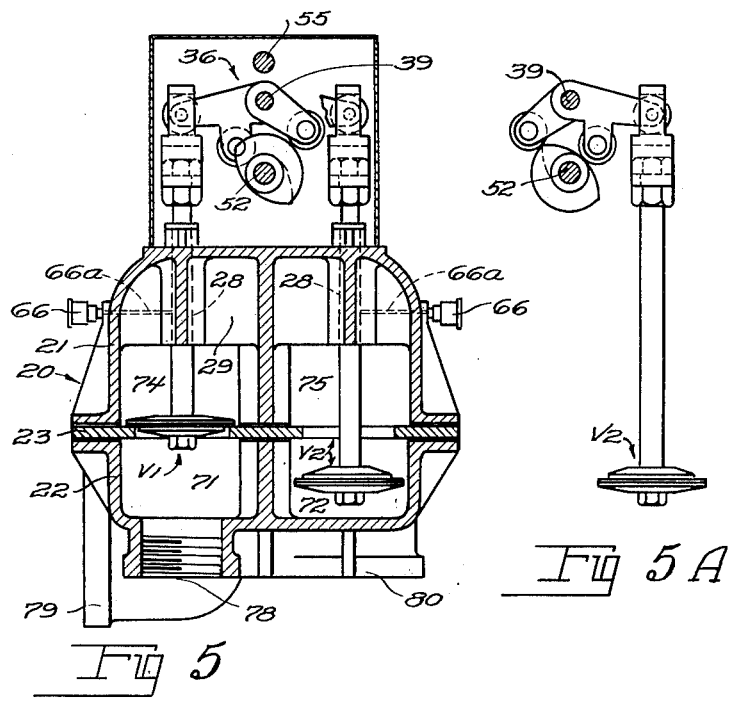
Fig 5
Fig 5A
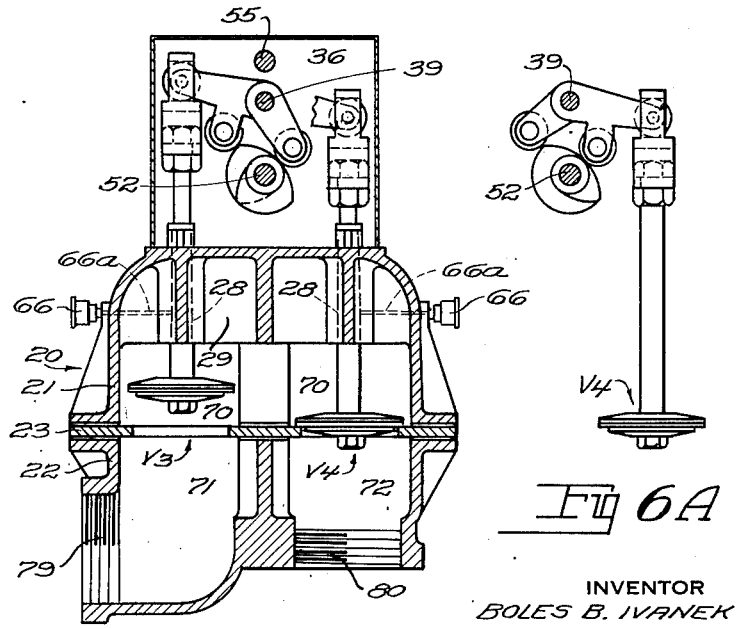
Fig 6
Fig 6A
INVENTOR
BOLES B. IVANEK

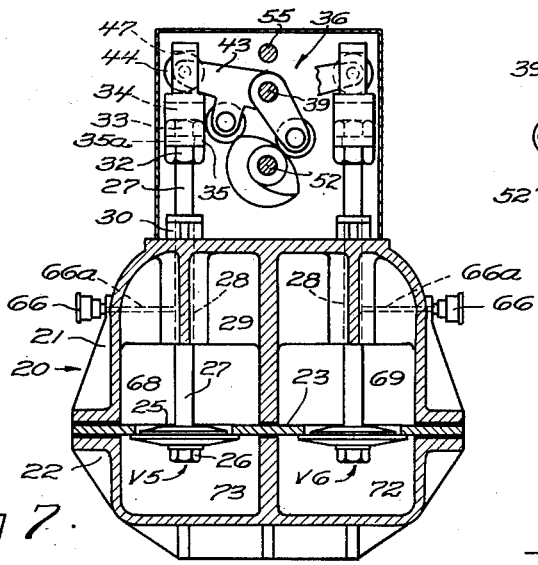

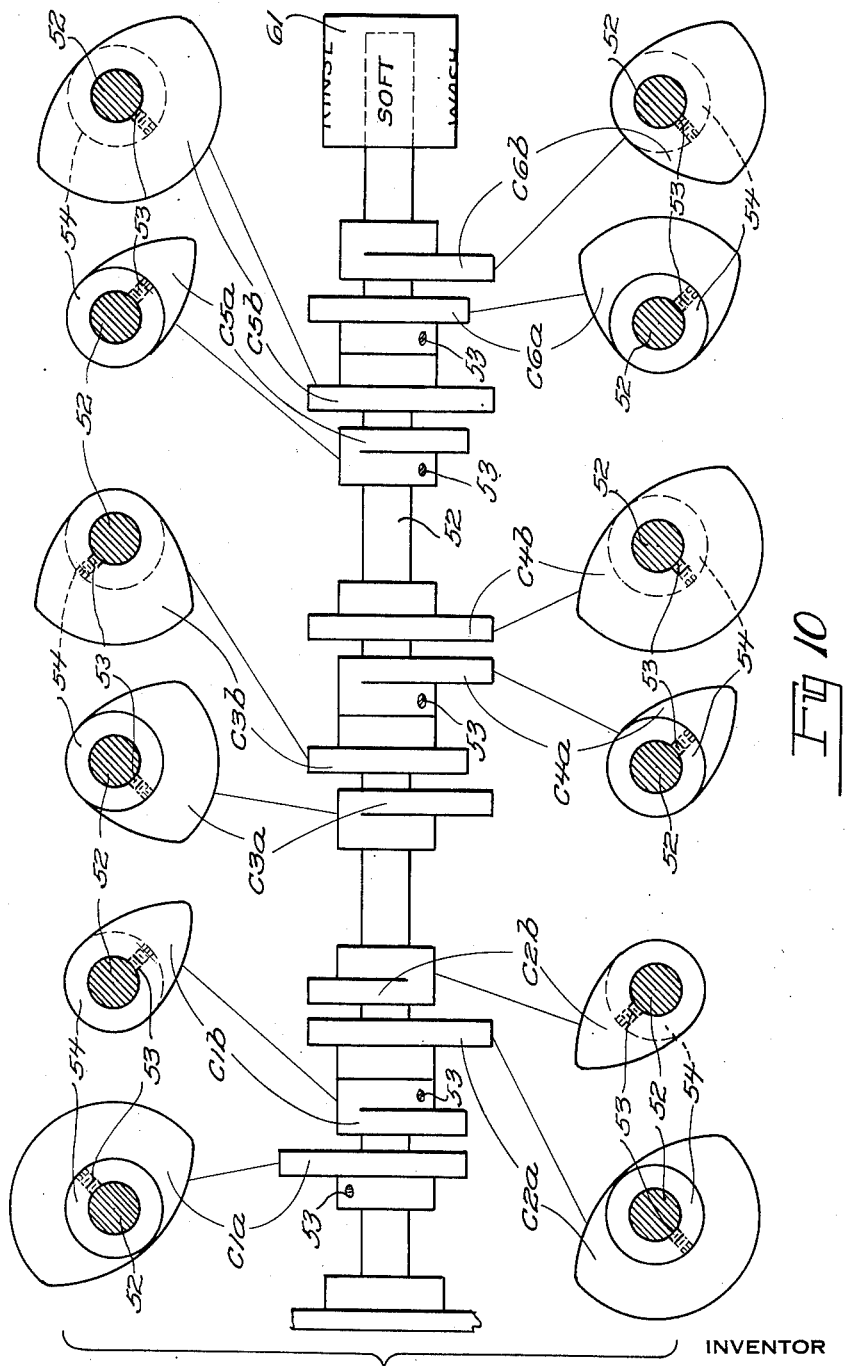

SOFTENING CYCLE

WASH CYCLE

BRINE CYCLE

RINSE CYCLE

INVENTOR
BOLES B. IVANEK
BY
Fraser, Myers & Manley
ATTORNEYS

Patented Nov. 4, 1952

2,616,446

UNITED STATES PATENT OFFICE 2,616,446

VALVE FOR LIQUID TREATING APPARATUS

Boles B. Ivanek, New York, N. Y.

Application August 6, 1948, Serial No. 42,821

2 Claims. (Cl. 137—627)

This invention relates to improvements in valves, and although a valve according to this invention may be adapted for various uses, it is particularly useful for controlling the various cycles of operation of systems designed for softening or for filtering water. For illustrative purposes a preferred embodiment of a valve according to the present invention is described and illustrated in this application as employed in a water softening system.

Water softening systems ordinarily operate in four distinct successive cycles: (1) a softening cycle in which what might be termed raw water is passed through a softener tank to subject it to softening media, and passes from the tank to the water system for which it is subject to being drawn off for use; (2) a wash cycle in which raw water is passed through the softener tank in a direction reverse to that of the softening cycle in order to clean, from the softener tank, matter removed from the raw water and held in that tank during the softening cycle; (3) a brine cycle in which a saline solution is introduced into the softener tank to recondition the contents thereof for further softening operations; and (4) a rinse cycle in which raw water is passed through the tank in the same direction as in the softening cycle, the water, however, being passed off to waste rather than into the water system; this cycle being for the purpose of removing excess brine that may have been introduced into the tank during the brine cycle.

It should be obvious that in order to effectuate these various cycles, valve means must be employed to establish, for each cycle, the proper connections to yield the desired direction and course of the flow of the water and the saline solution. It has been common practice, in water softening systems, to employ a plurality of separate valves, but, under such an arrangement, one operating the system must be exceedingly careful to assure that the various valves are properly set in order to carry out the various cycles of operation. This introduces the human element and the possibility of mistakes being made which might defeat the purpose of the system.

An important object of the present invention is the provision of a valve arrangement having a single operating or control medium which may be progressively shifted through successive settings corresponding to predetermined successive cycles of operation and which infallibly assures that in each successive setting, the valve ports controlling the various interconnections between the several parts of the system are properly arranged to carry out the predetermined cycle of operation.

Another important object of this invention is the provision of a multi-port valve which includes indicating means enabling one, operating the system, to become informed as to the precise cycle of operations for which the valve arrangement is set at any given time.

Another important object of the invention is the provision of a multi-port valve in which a single operating member is moved to a similar extent to effect each changeover of the valve setting from one cycle of operation to the next succeeding cycle of operation.

Another important object of the invention is the provision of a multi-port valve having generally an upper body portion and a lower body portion with a substantially flat port plate separating those portions and having disk valve elements coacting with the ports in the mentioned plate in such a way that the pressure in the system, during all cycles of operation, is predominantly effective on the valve disks to hold them firmly in closing position with respect to their related ports at all times when they are intended to be closed.

Another important object of the invention is the provision of means for operating such valve disks, which operate the latter positively rather than under spring bias to move the valve disks in either direction between their open and closed positions with respect to their related ports, this arrangement yielding substantial power economies.

Another object of the invention is the provision of means for operating the valve disks, which function with little or no friction and hence yield substantial power economies.

Another important object is the provision of a valve arrangement with valve disk operating means which are exterior of the valve body and hence easily accessible for lubrication.

The foregoing and other objects of the invention are accomplished by the provision of structures substantially as shown in the accompanying drawings, in which:

Figure 1 is a side elevation of a preferred embodiment of a valve according to the present invention.

Fig. 2 is an end elevation of the valve as viewed from the right side of Fig. 1.

Fig. 3 is a vertical longitudinal sectional view through the valve substantially on the line 3—3 of Fig. 2.

Fig. 4 is a vertical longitudinal sectional view through the valve substantially on the line 4—4 of Fig. 2.

Fig. 5 is a vertical cross-sectional view through the valve substantially on the line 5—5 of Figs. 1, 3 and 4.

Fig. 5A is a detail elevational view including the mechanism for operating the valve element appearing at the right side of Fig. 5.

Fig. 6 is a vertical cross-sectional view through the valve substantially on the line 6—6 of Figs. 1, 3 and 4.

Fig. 6A is a detail elevational view including the mechanism for operating the valve element appearing at the right side of Fig. 6.

Fig. 7 is a vertical cross-sectional view through the valve substantially on the line 7—7 of Figs. 1, 3 and 4.

Fig. 7A is a detail elevational view including the mechanism for operating the valve element appearing at the right side of Fig. 7.

Fig. 8 is a plan view of one of a plurality of rocking levers for operating the plural valve elements.

Fig. 9 is a side elevational view of one of said rocking levers.

Fig. 10 is a plan view of a camshaft employed for actuating the plural valve elements; this figure including reference cam diagrams showing the relative shapes and angular positions of the several cams on the camshaft.

Fig. 11 is a top plan diagram of valve chambers located above the port plate in the upper body portion of the valve.

Fig. 12 is a top plan diagram indicating valve chambers located below the port plate in the lower body portion of the valve.

Figure 13:
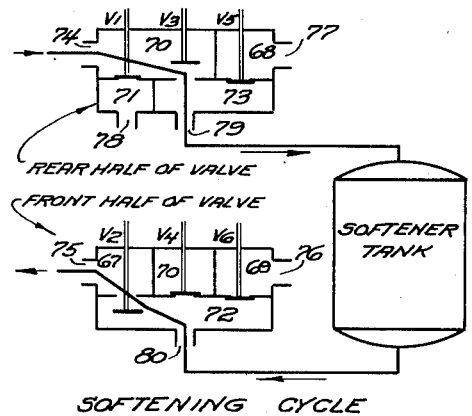
Fig. 13 is a flow diagram of a water softening system showing the manner in which valve means according to the present invention may be employed therein; this figure showing the valve settings and the course of water flow during a softening cycle.

Although the present invention may be embodied in various valve structures, nevertheless, for illustrative purposes a valve according to this invention is illustrated in the drawings as comprising a valve body 20 which may consist of an upper body portion 21 and a lower body portion 22 with an intervening port plate 23 all suitably secured together by bolts 24, suitable gaskets, of course, being provided between the several mentioned parts to render them water-tight.

The port plate 23, in the illustrated embodiment, is provided with six valve apertures and six valve elements coacting therewith to open and close said apertures. These apertures and their related valve elements are hereinafter sometimes generally referred to collectively merely as valves $V_1$, $V_2$, $V_3$, $V_4$, $V_5$, $V_6$. Except for the fact that some of the valve elements seat upon the upper margins of their related ports while others seat upon the underneath margins thereof, the six valves are substantially similar, each comprising a valve disk 25, held by a nut 26 upon the lower end of a valve stem 27 which extends vertically upwardly through bores 28 in an interior web 29 within the upper body portion 21 and also through a stuffing gland 30 located upon the top of the said body portion.

On the upper end of each valve stem, a valve yoke 31 is mounted and locked in place by a pair of locking nuts 32, 33. The yoke 31 is substantially cubical in shape and preferably is formed with a lower recess 34, partially defined by a bottom wall 35 which preferably is provided with an open slot 35a, so that a threaded upper portion of the valve stem 27 may be moved laterally into said slot with the nut 32 bearing against the underside of the bottom wall 35 and the nut 33 disposed within the recess 34 and bearing upon the upper side of said wall. After the valve stem 27 and the several mentioned nuts are associated with the yoke 31 in the described manner, one or the other of the nuts 32 or 33 may be tightened in order to lock the yoke firmly upon the upper end of the valve stem.

Obviously, in order to give to the valve stem and its associated yoke a combined length suitable for yielding the hereinafter described operation, the nuts 32, 33 may be adjusted longitudinally of the stem 27, thereby affording means for suitably dimensioning the combined stem and yoke.

Although disk valve elements are commonly spring-biased to hold them closed, and means usually are provided only for opening them against the tension of the biasing spring, nevertheless, according to the present invention, means are provided for positively opening and closing each valve element. In general, these means are similar for each valve element and preferably comprise a rocking lever 36, best shown in the valve assemblies in Figs. 5–7A, inclusive, and shown in detail in Figs. 8 and 9. Each of said rocking levers has a hub 37 with a bore 38 by which the lever is mounted upon a fixed shaft 39 supported at its opposite ends within upright bearing plates 40, 41 suitably mounted fixedly upon the top of upper body portion 21 of the valve. The rocking levers and the shaft 39 are so formed that the levers will fit closely upon said shaft, but, nevertheless, be capable of oscillatory rotation around the said shaft's axis.

The rocking lever 36 has a valve actuating arm 42 having a bifurcated end 43 within which a roller 44 is rotatably held by a head clevis pin 45, suitably held against displacement by a cotter pin 46. The clevis pin preferably fits tightly in the end 43 of the valve actuating arm and the roller 44 preferably fits closely, but, nevertheless, rotatably on the clevis pin.

The end 43 of the valve actuating arm and its roller 44 extend within an upper recess 47 in the yoke 31. The recess 47, as best seen in Fig. 4, is sufficiently wide to accommodate the length of the clevis pin 45 therewithin and is of a vertical dimension substantially similar to the diameter of the roller 44. Actually the vertical dimension of the recess 47 is slightly greater than the diameter of the roller 44, but only sufficiently greater to permit the latter to roll in said recess to a slight extent during angular movement of the valve actuating arm 42 while the valve stem and the yoke 31 pursue a purely rectilinear vertical movement. With this arrangement, it will be seen that as the rocking lever 36 is rocked the arm 42 thereof through its related roller 44 positively actuates the valve stem 27 vertically, so that the valve disk 25 will become either seated or unseated with respect to its related valve port, depending upon the direction of movement imparted to the valve element.

The rocking lever 36 also has two integral bifurcated cam follower arms 48, 49, within which, respectively, are suitably mounted cam rollers 50, 51, each held within its respective arm by a clevis-cotter pin arrangement similar to that used for roller 44. As best seen in Fig. 8, the arms 48 and 49 are in staggered relation or, in other words, are arranged in different longitudinal positions relatively to the bore 38 so that the rollers 50, 51 may coact with different cams in a manner hereinafter described.

It should be observed also that the valve actuating arm 42 is offset axially with respect to the remainder of the rocking lever so that each said lever and another similar lever, shown in broken outline in Fig. 8, may be paired upon the shaft 39 with the rollers 44 on each of the paired levers in transverse alignment and, hence, in position to coact with yokes 31 of valve elements at directly opposite points in the valve structure. One such pair of rocking levers is arranged on the shaft 39 in position to actuate valve elements $V_1$ and $V_2$; another pair is in position to actuate valve elements $V_3$ and $V_4$; and a third pair is in position to actuate valve elements $V_5$ and $V_6$.

Rocking motion is imparted to each rocking lever 36 by a suitable cam arrangement in which similar cams are provided for operating each valve which has similar movements during a set of operating cycles. In the illustrated embodiment of the present invention, different valve elements operate according to two different sequences of movement during a set of operating cycles and for that reason cam assemblies of two different cam surface arrangements are provided for these two groups of valve elements. Except for the several different shapes of cams, however, the cam mechanisms for operating all of the several valve elements are similar, and hence, a description of the cam mechanism with respect to one valve element should suffice to give an understanding of the operating means provided for all of the valve elements.

In the mentioned valve operating mechanism, a camshaft 52 extends lengthwise of the valve body 20 and is supported toward its opposite ends within the bearing plates 40, 41. This shaft, as best seen in Fig. 10, carries six pairs of cams fixed thereto: $C1a$ and $C1b$ for actuating the rocking lever 36 which operates valve element $V1$; $C2a$ and $C2b$ for actuating the rocking lever 36 which operates valve element $V2$; $C3a$ and $C3b$ for actuating the rocking lever 36 which operates valve element $V3$; $C4a$ and $C4b$ for actuating the rocking lever 36 which operates valve element $V4$; $C5a$ and $C5b$ for actuating the rocking lever 36 which operates valve element $V5$; and $C6a$ and $C6b$ for actuating the rocking lever 36 which operates valve element $V6$.

As best seen in Figs 5, 6 and 7, the camshaft 52 is disposed below shaft 39, and the rocking levers 36 and the mentioned cams are so positioned on their respective shafts that the cams coact properly with the cam followers 48 and 49 on their related rocking levers to impart rocking movement to the latter, and so that the rollers 44 of the valve actuating arms 42 of the several rocking levers are in proper operating position within the upper recesses 47 of the yokes 31 of the several valve element stems.

In Fig. 10, the shape of each cam and its angular position on the camshaft are shown separately with lead lines relating each of said cam contour showings with the related cam as mounted on the camshaft. Set screws 53 are provided in collars 54 of each cam for the purpose of locking the latter securely in their proper positions on the camshaft. The nature of the coaction between the several mentioned cams and the rocking levers and valve elements which they actuate is illustrated in Figs. 5, 5A, 6, 6A, 7 and 7A, with reference, respectively, to valve $V_1$, $V_2$, $V_3$, $V_4$, $V_5$ and $V_6$. From these figures, it may be seen that the cams are so shaped and inter-related that each rocking lever is positively rocked in both directions to open and close its related valve element without any material lost motion.

As illustrated herein, means are provided for manually rotating the camshaft 52 to operate the valve elements. The valve illustrated is designed to operate at four different combinations of valve element settings for four different cycles of operation, and it has been found to be highly desirable to provide for the camshaft 52 to be turned by the operation of a crank under an arrangement wherein each complete revolution of the crank yields one-fourth of a revolution of the camshaft to positions of the latter 90° removed from each other, in which positions the several valve elements will be in four different combinations of settings suitable for the four different cycles of operation.

To accomplish the mentioned desired camshaft operation, a crankshaft 55 is supported within the bearing plates 40, 41, preferably in a symmetrical position directly above camshaft 52. A crank 56, with a handle 57 is suitably keyed to one end of the crankshaft 55 and, upon the other end of the latter, is keyed a small sprocket wheel 58 which functions through a chain 59 to drive a large sprocket wheel 60, suitably keyed upon the corresponding end of the camshaft 52. This sprocket and chain arrangement is shown in broken lines in Fig. 2, from which it may be seen that the ratio between sprocket wheels 58 and 60 is as one is to four. Under this arrangement, each complete turn of the crank 56 serves to rotate the camshaft 52 one-fourth of a turn from each setting thereof for one cycle of the valve operation to the setting thereof which will yield the desired next successive cycle of operation. The crank 56 is always turned in the same direction where, as usual, the valve is arranged to yield more than two different cycles of operation.

It has been found helpful also to provide indicating means for visually indicating at all times the particular cycle of operation for which the valve is set to operate. Such means may be in the form of an indicia drum 61 keyed to the camshaft, preferably at the end thereof which is adjacent the crank 56, this drum preferably having suitable indicia applied to its outer surface. Assuming the illustrated valve to be adapted for use in a water softening system, the indicia "soft" and portions of "wash" and "rinse" are shown thereon in Fig. 10 in positions 90° removed from each other; and at a point 180° from "soft," the indicia "brine" (not visible in the drawing) would be applied to the drum.

The drum 61 may be arranged to extend within a cylindrical casing 62, fixed to the outside of the bearing plate 41, the said casing being provided with a transparent window 63, through which the mentioned indicia are visible to inform one as to the setting of the valve at any given time. Thus, as the valve elements are shown in the various figures of the drawings in the positions that they would be in during a softening cycle, the abbreviation "soft" appears at the window 63, as shown in Fig. 1; and successive complete turns of the crank 56, always in the same direction, will successively set the valve for "wash," "brine," and "rinse" cycles and will successively bring into view the indicia indicative of those cycles.

Side covers 64 of suitable thin material, such as for example sheet metal, may be provided and, as shown in Fig. 2, these covers may be hinged at their upper edges to the sides of a top cover plate 65, which may be suitably secured at its opposite ends to the upper edges of bearing plates 40 and 41. By swinging the side covers outwardly and upwardly, as indicated in Fig. 2, the various cams, rocking levers, and valve stem yokes are easily accessible for application of lubricant thereto. Lubricant may also be applied to the shanks of the valve stems by means of grease cups 66 which are provided for each valve stem and which are in fluid communication through ducts 66a with the bores 28 in the interior web 29 of the upper body portion through which the mentioned valve stems extend.

The foregoing should afford a clear understanding of the manner in which the several valve elements are actuated to adapt the valve for use in four different cycles of operation. The manner in which the valve may be connected and function in a water softening system will now be described.

The valve body of the illustrated embodiment of this invention is divided into seven chambers provided with suitable outlet and inlet connections by which the valve may be connected by piping to various parts of the equipment comprising a water softening system. Although the various chambers and pipe connections may be located in Figs. 1–7, inclusive, nevertheless, the diagrams constituting Figs. 11 and 12 should enable one to more easily visualize the interior structure of the valve and its connections; and the manner in which it is connected and operated in a water softening system is illustrated in Figs. 13–16, inclusive.

From Fig. 11, it may be seen that the interior of the valve body above the port plate 23 is divided into three small chambers 67, 68, 69, which, respectively, are controlled by valve elements $V_2$, $V_5$, $V_6$, and a large chamber 70 which is controlled by the operation of any one of the three valve elements $V_1$, $V_3$, $V_4$. The interior of the valve body below the port plate is divided, as shown in Fig. 12, into a small chamber 71 controlled by valve element $V_1$, a large chamber 72 controlled by any one of the valve elements $V_2$, $V_4$, $V_6$, and a chamber 73 of intermediate size which is controlled by either of valve elements $V_3$, $V_5$.

The precise arrangement of the inlet and outlet connections to the valve body may be ascertained by reference to Figs. 1–7, but some latitude of design, obviously, is permissible with respect to the location of such connections. To simplify the diagrams of Figs. 11 and 12, the pipe connections are indicated therein with respect to their association with the several chambers within the valve body and without regard to their precise location in the valve casing. From said figures, and also from Figs. 1–7, inclusive, it may be observed that the mentioned connections include a raw water inlet 74 affording communication with chamber 70, a treated water outlet 75 affording communication with chamber 67, a rinse water outlet 76 affording communication with chamber 69, a wash water outlet 77 affording communication with chamber 68, an outlet 78 for connection of chamber 71 to a brine injecting apparatus, a connection 79 for chamber 73 for connecting the latter to the top of a softener tank, and a connection 80 for chamber 72 for connecting the latter to the bottom of a softener tank.

Connections as recited in the preceding paragraph are also shown in the flow diagrams of Figs. 13, 14, 15 and 16, which illustrate the manner in which a valve according to the present invention is connected and functions in a water-softening system. The operation of a valve according to this invention in such a system commences with the crank 56 in a depending position, as shown for example in Figs. 1, 2, and 3, with the camshaft 52 in such angular position that the legend "soft" is visible at the window 63 and the various cams on that shaft are in such angular positions as to hold the several valve elements either open or closed, as indicated in Fig. 13 for a softening cycle. In this condition of the valve, raw water passes through inlet 74 into chamber 70, from which it passes open valve element $V_3$ to chamber 73, thence through outlet 79 to the top of the softener tank. The treated water passes from the bottom of the softener tank through connection 80 into chamber 72, thence past open valve element $V_2$ into chamber 67, from which it passes through outlet 75 into the main water system, from which it may be withdrawn for use.

Figure 14:
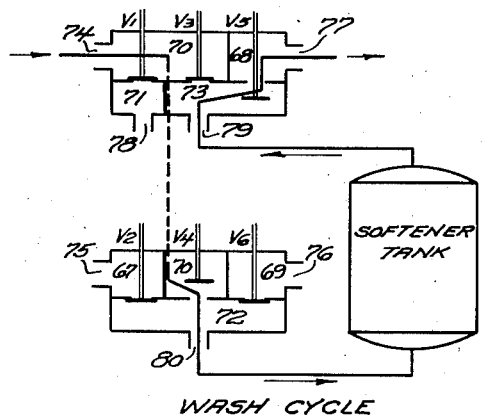
Fig. 14 is a diagram similar to Fig. 13, but showing the valve settings and the course of water flow during a wash cycle.

Periodically, the softener tank must be washed to clear it of impurities and, for this purpose, the crank 56 is given a complete turn which leaves it in its same depending position, but has the effect of giving the camshaft 52 a one-quarter turn, bringing the legend "wash" into view at the window 63 and bringing the various cams on the camshaft into their angular positions which will set the various valve elements in their positions, as indicated in Fig. 14, to yield a wash cycle. In this condition of the valve, raw water passes through inlet 74 to chamber 70, thence past open valve element $V_4$ into chamber 72, from which it passes through connection 80 to the bottom of the softener tank. The water then passes through the softener tank in a reverse direction to that pursued in the softening cycle and the water emerges from the top of the softening tank, whence it passes through connection 79 into chamber 73, thence past open valve element $V_5$ into chamber 68, from which it passes through outlet 77 to suitable drainage means, thus effecting a washing cycle.

After the washing cycle has been in effect for a sufficient period of time to cleanse the softener tank of impurities, the crank 56 is given another complete turn bringing it again to its same depending position. This imparts a further one-quarter turn to the camshaft 52, bringing the indicia "brine" into view at the window 63 and bringing the various cams into their angular positions which adjust the various valve elements to their positions indicated in Fig. 15. In this condition, the system functions to inject brine into the softener tank. In this cycle of operation, raw water passes through inlet 74 into chamber 70, thence past open valve element $V_1$ into chamber 71, from which it passes through connection 78 to a suitable brine injector. The water is made saline in passing through the brine injector, and this saline solution is injected into the softener tank at the top of the latter and passes through said tank to be carried from the bottom thereof through connection 80 into chamber 72, thence past open valve element $V_6$ to chamber 69, from which the solution passes through outlet 76 to waste.

Figure 16:
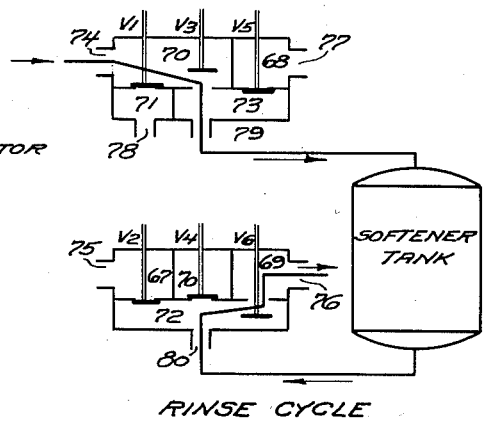
Fig. 16 is a diagram similar to Figs. 13, 14 and 15, but showing the valve settings and the course of water flow during a rinse cycle.

After the brine cycle, just described, has been in effect for a suitable time, it is necessary to rinse excess brine from the softener tank; and to effect such a rinse cycle, the crank 56 is given another complete turn to bring it again into its depending position. This gives the camshaft 52 another one-quarter turn, bring legend "rinse" into view at the window 63 and bringing the various cams into angular positions which adjust the various valve elements to their positions, as shown in Fig. 16. In this condition of the system, raw water passes through inlet 74 into chamber 70, thence past valve element $V_3$ into chamber 73 and through connection 79 to the top of the softener tank. The rinse water circulates through the tank and passes from the bottom thereof through connection 80 into chamber 72, thence past open valve element $V_6$ into chamber 69, from which it is discharged through outlet 76 to waste.

After the mentioned rinse cycle has been in effect for a sufficient length of time, the system is again restored to its condition in which it will produce softened water for the main water system by giving the crank another full turn to bring it to its same depending position. This gives the camshaft 52 another one-quarter turn, again bringing the legend "soft" into view at the window 63 and bringing the various cams into their angular positions to set the various valve elements to their positions, as shown in Fig. 13. Thus, the apparatus has been returned to its softening cycle for its continued use.

It may be observed that in the wash, brine and rinse cycles, the water is discharged to waste, hence, because of the resistance offered to the flow of the water by the softener tank and, in the brine cycle, by the brine injector, the water pressure is higher in the chambers of the valve handling water between the softener tank and brine injector and the source of water supply than in the chambers at the side of said softener tank which is connected to waste. This pressure differential, present in the three-mentioned cycles, serves to hold the valve disks, of valve elements then intended to be closed, positively seated in their respective ports. This is desirable because of the fact, already described, that the valve elements are actuated positively both to open and closed positions without the use of any biasing springs. With such positive operation, which necessarily requires certain tolerances between operating parts, the valve disks may not seat forcefully in their respective ports in response to the described valve operating mechanism; but the mentioned pressure differential firmly holds all closed valve elements in their closed positions.

The effect of the described pressure differential may be understood by reference to Fig. 14, wherein the liquid in the valve chambers 70 and 72 during the wash cycle is under greater pressure than the liquid in the other chambers. Hence, valve elements $V_1$, $V_3$ and $V_6$ are held firmly closed by that predominant pressure.

Figure 15:
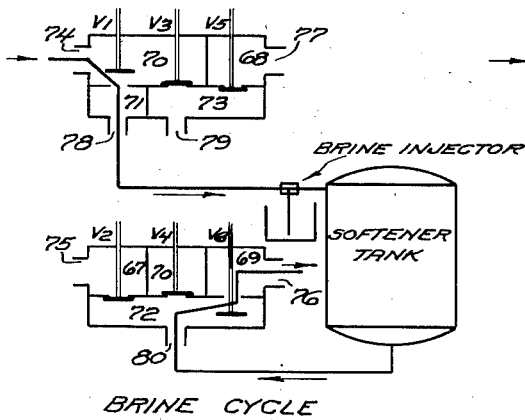
Fig. 15 is a diagram similar to Figs. 13 and 14, but showing the valve settings and the course of water flow during a brine cycle.

Referring to Fig. 15, the pressure in chambers 70 and 71 during the brine cycle is greater than in the other chambers, and the pressure in chamber 72 is greater than the pressure in chamber 67; hence, the predominant pressure in chamber 70 holds valve elements $V_3$ and $V_4$ firmly in their closed positions and the predominant pressure in chamber 72 holds valve element $V_2$ in its closed position. In this cycle of operation, the chambers 68 and 73 are inactive; hence, there is no particular necessity for valve element $V_5$ to be held closed by pressure during that cycle.

Referring to Fig. 16, the fluid pressure in chambers 70 and 73 is greater than the pressure in the other chambers, and the pressure in chamber 72 is greater than in chamber 67; hence, the predominant pressure in chamber 70 holds valve elements $V_1$ and $V_4$ firmly in their closed position, the predominant pressure in chamber 72 holds valve element $V_2$ in its closed position, and the predominant pressure in chamber 73 holds valve element $V_5$ in its closed position.

Referring to Fig. 13, the pressure in chambers 70 and 73, while water is being drawn from the main water system during the softening cycle, is greater than the pressure in all other chambers of the valve and the pressure in chamber 72 is greater than in chamber 69, so that the predominant pressure in chamber 70 functions to hold valve elements $V_1$ and $V_4$ firmly in their closed positions, the predominant pressure in chamber 73 holds valve element $V_5$ firmly closed, and the predominant pressure in chamber 72 holds valve element $V_6$ firmly closed.

However, when water is not being drawn from the main water system and the valve is set for the softening cycle, the unit fluid pressure would be equivalent in chambers 70, 73, 72 and 67, and this pressure would be greater than the pressure in chambers 68, 69 and 71. Under this condition the predominant pressures in chambers 70, 73 and 72, respectively, operate to hold firmly closed the valve elements $V_1$, $V_5$ and $V_6$. Valve element $V_4$, however, is not subject to any predominant unit pressure on either side thereof because that valve element is disposed between chambers 70 and 72 in which the unit pressures at this time are in balance. However, despite this balance of unit pressures, it is obvious that as the top area of the disk of valve element $V_4$ subjected to such pressure is greater than the bottom area thereof which is subjected to that pressure, valve element $V_4$ will be held firmly closed by the predominant force exerted by the pressure on the upper side of its disk.

It should be apparent from the foregoing and from the drawings that a valve according to the present invention may possess the advantage that single successive complete turns of the crank 56 may operate to set the valve for the successive functions which that valve must perform in controlling a water softening system or other systems having certain sequences of operation.

Those familiar with water softening systems and with water filtering systems will appreciate that a valve according to the present invention may function also in a filtering system, in which the valve operates to pass water to and from a filter tank. In such filtering systems, the tank must occasionally be washed and this is usually accomplished by a reversal of water through the tank, and a rewash or rinse cycle may be one in which the water is again caused to flow through the tank, in the original direction; but such rewash or rinse water is passed to a rinse outlet instead of into the piping of the main water system.

When a valve according to this invention is used in a filtering system, the cams are set at such angular positions on the camshaft as to yield successive operating cycles substantially as follows: a filtering cycle in which the valve is employed with a filtering tank in the same manner as it is employed with the softener tank in a water softening system during a softening cycle; a wash cycle in which the valve is employed with a filtering tank in the same manner as it is employed with the softener tank in a water softening system during a wash cycle; a rewash or rinse cycle in which the valve is employed with a filtering tank in the same manner as it is employed with a softener tank in a water softening system during a rinse cycle. However, as no brine cycle is involved in a filtering system, the fourth cycle setting of the valve elements, when employed in such a system, would be such as to merely establish a by-pass connection between the raw water supply and the main water system as the crank 56 is given an extra turn to restore the valve to its filtering cycle. Optionally, of course, instead of by-passing the water around the filtering tank during this fourth cycle setting, the cams could be so shaped and adjusted upon the camshaft that the water would pass through the filter in either the first described filtering cycle or the fourth cycle described with respect to a filtering system. It will also be understood that a three-cycle valve may be designed, within this invention, for operation in a filtering system.

From the foregoing description, it should be apparent that, because of the provision of the rollers 44, 50 and 51 for coaction, respectively, with the yokes 31 of the valve stems and with the several cams, there is little or no friction loss involved in actuating the various valve elements. Also, inasmuch as biasing springs are dispensed with in the valve, a minimum of force is required to shift the valve elements between their open and closed positions. Obviously this minimizing of friction loss and of the force required to shift the valve elements renders those elements operable with a much lower power expenditure than would otherwise be necessary; and this attribute of the invention makes it possible to provide much smaller and less expensive power means for operating the valve if such power operation is desired.

If power means rather than manual means are employed to operate the camshaft, the power means may be arranged to operate discontinuously under manual control in order to effect each cycle of operation separately. Also, within the invention, the duration of the several operating cycles could be under automatic time control means to yield more perfect and satisfactory operation of the system as a whole. Obviously, a valve according to the present invention fulfills all of the several objectives hereinbefore set forth.

In addition to the specific alternative arrangements hereinbefore mentioned, it should be apparent that the present inventive concept may be employed in various valve structures other than the specific structures illustrated and described herein, without departing from the spirit of the invention as set forth in the following claims.

What I claim is:

1. A manually operable multi-port valve for liquid treating apparatus wherein such apparatus is adapted to perform a predetermined number of successive cycles of operation, comprising an upper body portion with walls dividing it into a plurality of upper chambers, a lower body portion with walls dividing it into a plurality of lower chambers, said body portions having openings formed therein for communication with supply or exhaust elements of said liquid treating apparatus, port means positioned between said body portions, a plurality of valve elements having valve head portions at their inner ends coacting with respective ports in said port means for controlling the flow of liquid between said upper and lower chambers and having valve stems extending outwardly through one of said body portions to the exterior thereof, a plurality of pivotally mounted rocking levers each free from spring action and coacting with the outer ends of respective valve stems positively to open and close respective valve elements, a camshaft having dual cam surfaces coacting with each of said rocking levers and so shaped and angularly disposed in fixed relation on said camshaft as to provide, when said camshaft is in different predetermined angular positions corresponding to respective successive cycles of operation, different predetermined valve-head-position combinations corresponding to said respective successive cycles of operation, indicia operatively associated with said camshaft visibly to indicate the particular cycle of operation for which said valve heads are positioned, a manually rotatable driving element, and transmission reducing means operatively coupling said driving element to said camshaft for rotating the latter, in response to a single complete rotation of said driving element, only through a predetermined revolution from one angular position corresponding to one cycle of operation to the next successive angular position corresponding to the next successive cycle of operation.

2. A manually operable multi-port valve according to claim 21, wherein said rocking arms have two separate cam-follower arms each angularly spaced from each other about the pivot of the rocking lever and each coacting respectively with one of the associated dual cam surfaces, one of said arms deriving movement from its related cam surface to open a respective valve head and the other of said arms deriving movement from its related cam surface to close said respective valve head.

BOLES B. IVANEK.

REFERENCES CITED

The following references are of record in the file of this patent:

UNITED STATES PATENTS

| Number | Name | Date |
|---|---|---|
| 739,334 | Moore | Sept. 22, 1903 |
| 900,197 | Osman | Oct. 6, 1908 |
| 1,050,176 | Schneible | Jan 14, 1913 |
| 1,061,681 | Feilner | May 13, 1913 |
| 1,084,514 | Whitlock | Jan. 13, 1914 |
| 1,398,703 | Neuteboom | Nov. 29, 1921 |
| 1,538,709 | Lapworth | May 19, 1925 |
| 2,012,194 | Hughes | Aug. 20, 1935 |
| 2,453,707 | Graham | Nov. 16, 1948 |
| 2,460,011 | Hungerford | Jan. 25, 1949 |
| 2,467,461 | Blanding | Apr. 19, 1949 |
| 2,539,221 | Badeaux | Jan. 23, 1951 |